US008825498B2

(12) United States Patent  
Kollgaard

(10) Patent No.: US 8,825,498 B2  
(45) Date of Patent: Sep. 2, 2014

(54) RAMP RECORDER AND QUICK REPORTING TREE DATA TRANSMISSION METHOD

(75) Inventor: Jeffrey R. Kollgaard, Kent, WA (US)

(73) Assignee: The Boeing Company, Chicago, IL (US)

( * ) Notice: Subject to any disclaimer, the term of this patent is extended or adjusted under 35 U.S.C. 154(b) by 1059 days.

(21) Appl. No.: 11/673,685

(22) Filed: Feb. 12, 2007

(65) Prior Publication Data

US 2008/0195403 A1    Aug. 14, 2008

(51) Int. Cl.
G06Q 10/00 (2012.01)
G06Q 50/30 (2012.01)
G06Q 10/06 (2012.01)

(52) U.S. Cl.
CPC .............. *G06Q 10/06* (2013.01); *G06Q 50/30* (2013.01)
USPC ............................ 705/1.1; 707/621; 707/692

(58) Field of Classification Search
USPC .......................................................... 705/1
See application file for complete search history.

(56) References Cited

U.S. PATENT DOCUMENTS

| 5,517,405 | A  | * | 5/1996  | McAndrew et al. ............ 706/45 |
| 6,314,361 | B1 | * | 11/2001 | Yu et al. ........................ 701/120 |
| 6,378,387 | B1 | * | 4/2002  | Froom ........................ 73/865.8 |
| 6,574,537 | B2 |   | 6/2003  | Kipersztok et al. |
| 7,222,514 | B2 |   | 5/2007  | Kollgaard et al. |
| 7,275,049 | B2 |   | 9/2007  | Clausner et al. |
| 2002/0147615 | A1 | * | 10/2002 | Doerr et al. ........................ 705/2 |
| 2002/0156558 | A1 | * | 10/2002 | Hanson et al. ................... 701/33 |
| 2003/0061141 | A1 | * | 3/2003  | D'Alessandro ................. 705/36 |
| 2004/0199307 | A1 | * | 10/2004 | Kipersztok et al. ............. 701/29 |
| 2005/0040224 | A1 | * | 2/2005  | Brinton et al. ................. 235/376 |
| 2006/0031041 | A1 | * | 2/2006  | Afshar et al. .................. 702/184 |
| 2006/0079792 | A1 | * | 4/2006  | Finburgh et al. .............. 600/485 |
| 2006/0115109 | A1 | * | 6/2006  | Whitson et al. ............... 382/100 |
| 2007/0010923 | A1 | * | 1/2007  | Rouyre .......................... 701/29 |
| 2007/0084290 | A1 |   | 4/2007  | Fetzer |
| 2008/0109187 | A1 |   | 5/2008  | Kollgaard et al. |
| 2008/0150342 | A1 |   | 6/2008  | Kismarton et al. |
| 2008/0156096 | A1 |   | 7/2008  | Kollgaard |

OTHER PUBLICATIONS

U.S. Appl. No. 12/118,037, filed May 9, 2007, Brent Hadley et al.
U.S. Appl. No. 12/118,055, filed May 9, 2007, Brent Hadley et al.

* cited by examiner

*Primary Examiner* — Gabrielle McCormick
(74) *Attorney, Agent, or Firm* — Haynes and Boone, LLP

(57) ABSTRACT

A system and method for determining whether an aircraft is ready to fly or should be repaired in light of damage and/or malfunction information observed at the departure gate includes observing damage or malfunction, alerting decision-makers, and initiating an automated interview session via a camera equipped communications device to a remote server running query driven decision and data analysis software. Data entered via the communications device, equipped with a keypad and camera for obtaining visual information, is transmitted to the remotely based software application. The software generates requests for information based on prior received information, processes and provides the information to decision-makers at remote locations. The communications device transmits decision-making support information concerning repair or dispatch. The communication device may be a wireless cell phone with a digital camera. The method and system produce a report for making repair and dispatch decisions concerning the aircraft. The information is stored in a database for statistical analysis.

15 Claims, 5 Drawing Sheets

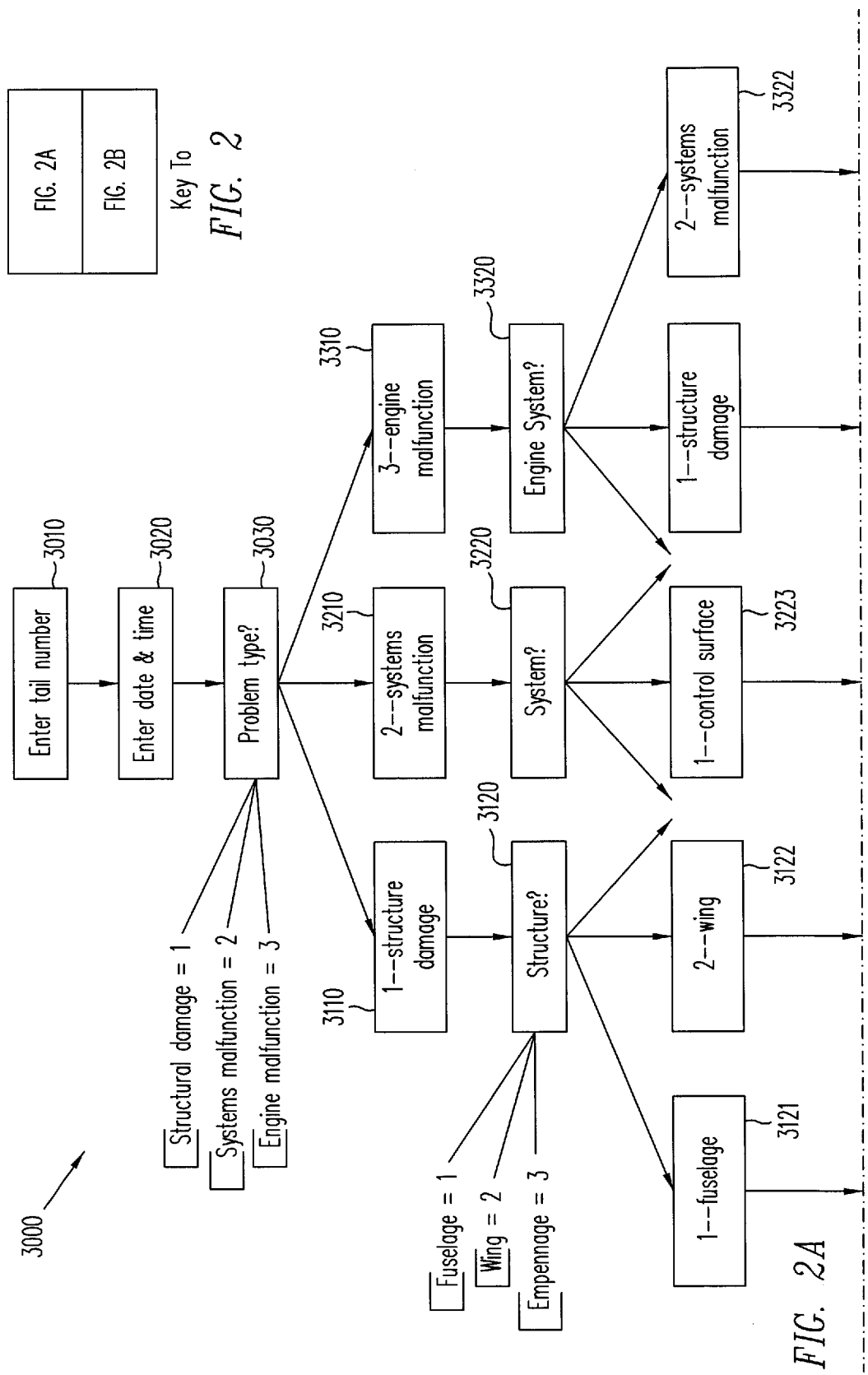

US 8,825,498 B2

RAMP RECORDER AND QUICK REPORTING TREE DATA TRANSMISSION METHOD

TECHNICAL FIELD

The present invention relates generally to capturing and recording information for repair decision-making and statistical trend evaluation of damage and/or malfunction of aircraft structures and systems.

BACKGROUND

Currently there is no standardized method for conveying information about aircraft damage and/or malfunction to a centralized decision-making center in a manner efficient enough to enable quick dispatch or grounding-for-repair of an aircraft. Furthermore, the methods in use today involve a combination of modes with much of the important data manually typed or verbally communicated. These methods of communication do not allow the information to be stored in a format that adequately captures history and allows forecasting. For example: a verbal telephone report or an e-mail description can not be efficiently incorporated into a spreadsheet or relational database, or quantified, without a labor-intensive "translation" process by a human operator.

As a result, there is a need for a standardized, efficient system and method for transmitting data on damage and malfunctions of aircraft structures and systems for rapid decision-making, and accumulation of statistical data for analyzing, identifying and forecasting damage trends for quality control and product improvement.

SUMMARY

In a first embodiment, a method of determining whether an aircraft is ready to fly or should be repaired in light of damage and/or malfunction to the aircraft is provided. The method includes the acts of: conducting an automated query and response session between a user observing the aircraft damage and/or malfunction and a remotely located computer application via a communications device, the computer application being adapted to request, receive and analyze data related to the damage and/or malfunction, preparing a damage report for the user by the computer application based upon the automated query and response session, and deciding whether the aircraft is ready to fly or should be repaired based upon the damage report.

In a second embodiment, a method of determining whether an aircraft is ready to fly or should be repaired in light of damage and/or malfunction to the aircraft is provided. The method includes the acts of: receiving a request at a remotely located computer application from a user, via a communications device, observing the aircraft damage and/or malfunction at a boarding ramp area for an automated query and response session; in response to the request, conducting an automated query and response session between a user observing the aircraft damage and/or malfunction and a remotely located computer application via a communications device, the computer application being adapted to request, receive and analyze data related to the damage and/or malfunction; and determining whether the aircraft is ready to fly or should be repaired, based on the damage report.

In a third embodiment, a system is provided that includes: a computer system adapted to operate an interactive computer application operable to conduct a query and response interview session with a user viewing aircraft damage, wherein the computer application is further operable to generate a report about the aircraft damage based upon the query and response interview to assist the decision whether the aircraft should be repaired or is ready to fly.

The scope of the invention is defined by the claims, which are incorporated into this section by reference. A more complete understanding will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with one or more embodiments, methods and systems are disclosed for reporting and documenting aircraft damage at the boarding ramp for rapid assessment and dispatch/repair decision making.

Figure 1A:
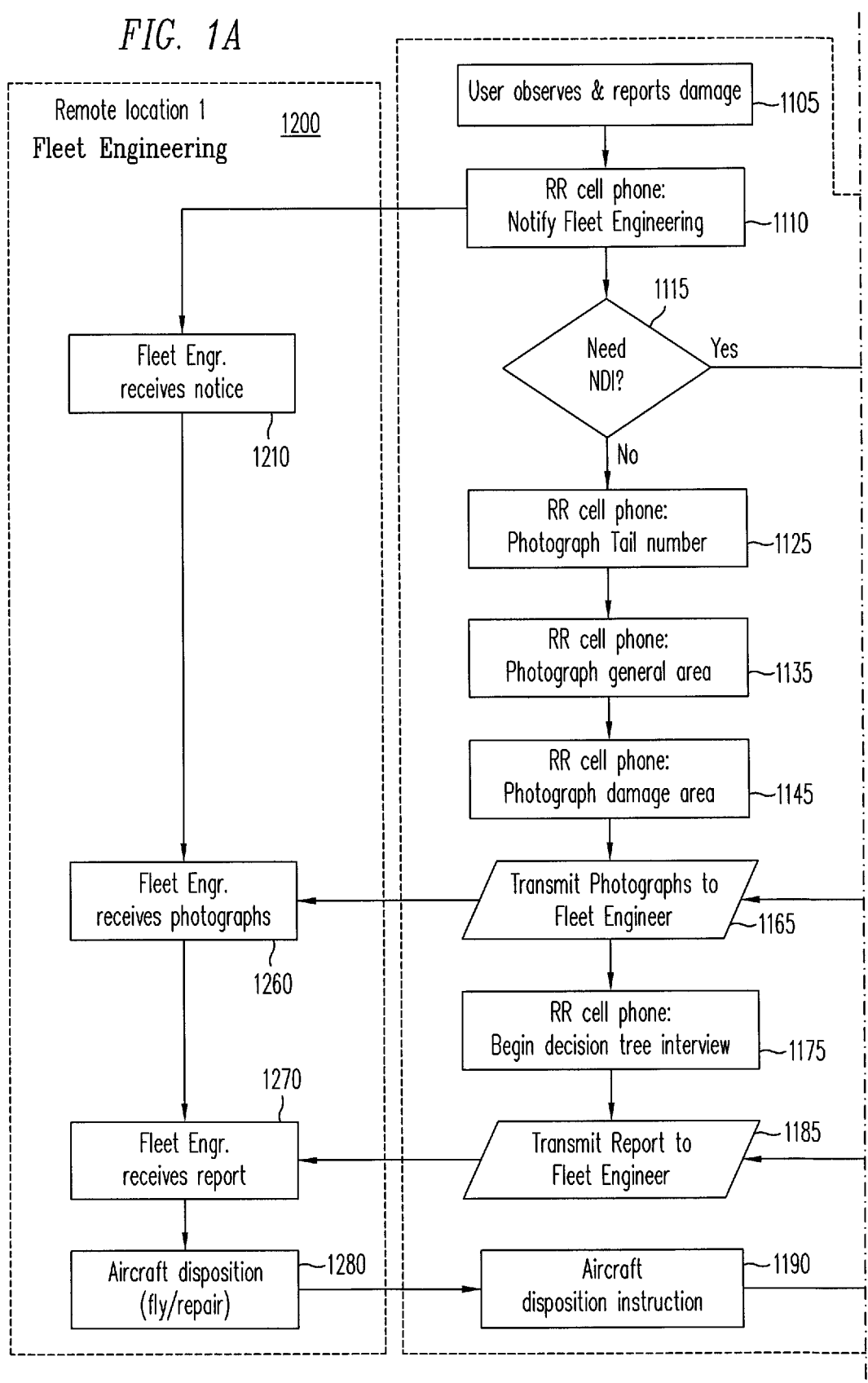
FIG. 1 is a block diagram flowchart illustrating a method of reporting, recording, assessment and disposition of damage and malfunction incidents, in accordance with an embodiment.
Figure 1B:
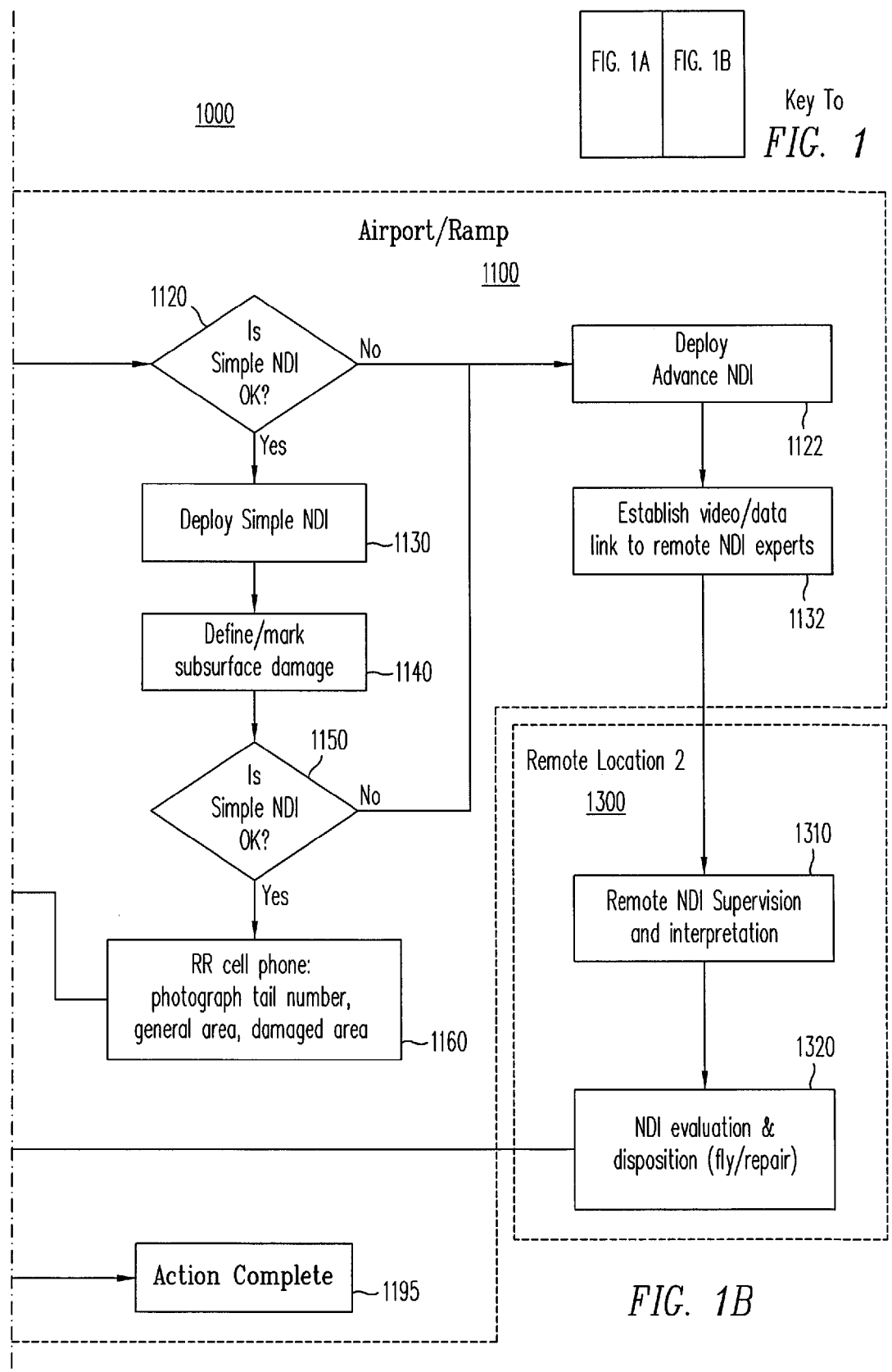

FIG. 1 shows an exemplary method in accordance with one embodiment of the procedures that may be included in a quick reporting decision tree data transmission system 1000.

A user, who may be personnel working in the airport ramp area (block 1100) around the aircraft during the boarding, servicing and loading activities, observes an incidence of damage or malfunction (block 1105). The user accesses a rapid reporting communications device, such as a cell phone (e.g., RR cell phone) to communicate the observation (block 1110) to Fleet Engineering at Remote Location 1 (block 1200). Specifically, a supervisory person, such as a Fleet Engineer, receives notice of the observed incident (block 1210). If the incident relates to damage of a composite structure of the aircraft, the method proceeds as illustrated in FIG. 1. Similar quick reporting decision tree data transmission systems may be described for procedures that relate, for example, to non-composite damage or electrical or mechanical malfunctions. In this embodiment, the method will be described with respect to treatment of composite damage.

A discussion between the ramp area personnel and Fleet Engineer (via block 1110 and block 1210) is held using the rapid reporting communications device. This results in a decision whether some measure of nondestructive inspection (NDI) is required (block 1115). If the determination is such that the incident is of a minor nature as to not require NDI (e.g., a NO decision in block 1115 for a surface scratch) a routine documentation is captured as follows: The RR cell phone is equipped with image acquisition and transmission capability, as, for example, a cell phone with a digital camera. For recordkeeping, the ramp personnel photographs specific areas of the aircraft with the RR cell phone, such as the tail number (block 1125) for identification, the general damage area (block 1135), and any further detailed images (block 1145). The ramp area personnel transmits the images via the RR cell phone (block 1165) to the Fleet Engineer, who receives and evaluates them (block 1260).

The ramp personnel may, at this time, initiate a decision tree interview (block 1175) with the Quick Reporting Tree system (to be described below) in which an automated process of directed questions, based on responses from the ramp personnel, obtains information at finer levels of granularity for evaluating the damage and suggesting disposition actions.

For the current case, in which the damage is determined to be of a very minor nature, or easily resolved, the Quick Reporting Tree system returns a report which is transmitted to ramp personnel and Fleet Engineering (block 1185). The Fleet Engineer receives the report ((block 1270) and, after evaluating all evidence in hand, makes a decision (block 1280) as to whether the aircraft can fly (i.e., depart) or is in need of some level of repair. Aircraft Disposition Instructions (block 1190) are received at the ramp/boarding area, pursuant to the Aircraft Disposition decision (block 1280) issued by the Flight Engineer. At this point, the rapid assessment and dispatch/repair decision making process is considered finished, and the Action Complete (block 1195).

In the case where consultation between ramp personnel and Fleet Engineering (via blocks 1110 and 1210) determines that NDI measures are required (a YES decision in block 1115), the next decision concerns whether a simple category of pass/fail NDI tests may be sufficient (block 1120). If the decision is positive (i.e., YES), then one or more simple NDI tests instruments are deployed (block 1130) by ramp personnel. Using the simple NDI test instruments, the ramp personnel attempts to determine if subsurface damage exists. (block 1140). An evaluation of the simple NDI tests (block 1150) determines whether the tests are sufficient to assess whether the potential for subsurface composite damage has been adequately assessed. If the NDI test produces satisfactory results (i.e., OK) and damage is limited or cosmetic (i.e., a YES), at this point the ramp personnel may acquire, via the RR cell phone camera (block 1160) identifying information, including images of the aircraft tail number, general area of the aircraft, and damaged area. The personnel will then transmit the imagery to the Fleet Engineer (block 1165), who receives and evaluates the imagery and information (block 1260) as above. The assessment process then continues as previously described from this point onward.

In the case where simple NDI tests produce unclear or unsatisfactory results (as determined at either block 1120 or 1150) the decision is made to deploy extensive and quantitative Advanced NDI (block 1122). This procedure may require, for example, establishing a video and data link (block 1132) between advanced NDI equipment at the ramp location and an expert located at a Remote Location 2 who is trained to evaluate NDI imagery and data and, for practical reasons of resource allocation, may not be available at every possible boarding/ramp location.

Data and imagery may then be transmitted to Remote Location 2 (block 1300), where the NDI expert remotely supervises and interprets NDI data (block 1310). The expert evaluates the NDI data and imagery and prepares a damage report (block 1320). That report is transmitted to personnel at the Airport/Ramp location (block 1100) to provide documentation to Fleet Engineering (block 1270 via block 1185) for Aircraft Disposition (block 1280) and Airport Disposition Instructions (block 1190), and is also entered and recorded in the Quick Reporting Tree system as coded data, to be described below. The Quick Reporting Tree system provides a comprehensive report, including the NDI report, which are both received (block 1270), as above, by Aircraft Disposition decision (block 1280) at Remote Location 1 (block 1200) and forwarding of Aircraft Disposition Instructions (block 1190) to Airport/Ramp (block 1100). These steps conclude the interview and assessment with Action Complete (block 1195). Similar flowcharts may be constructed to describe methods of responding to damage to non-composite structures, mechanical or electrical malfunctions, all of which are contemplated as embodiments.

Figure 2B:
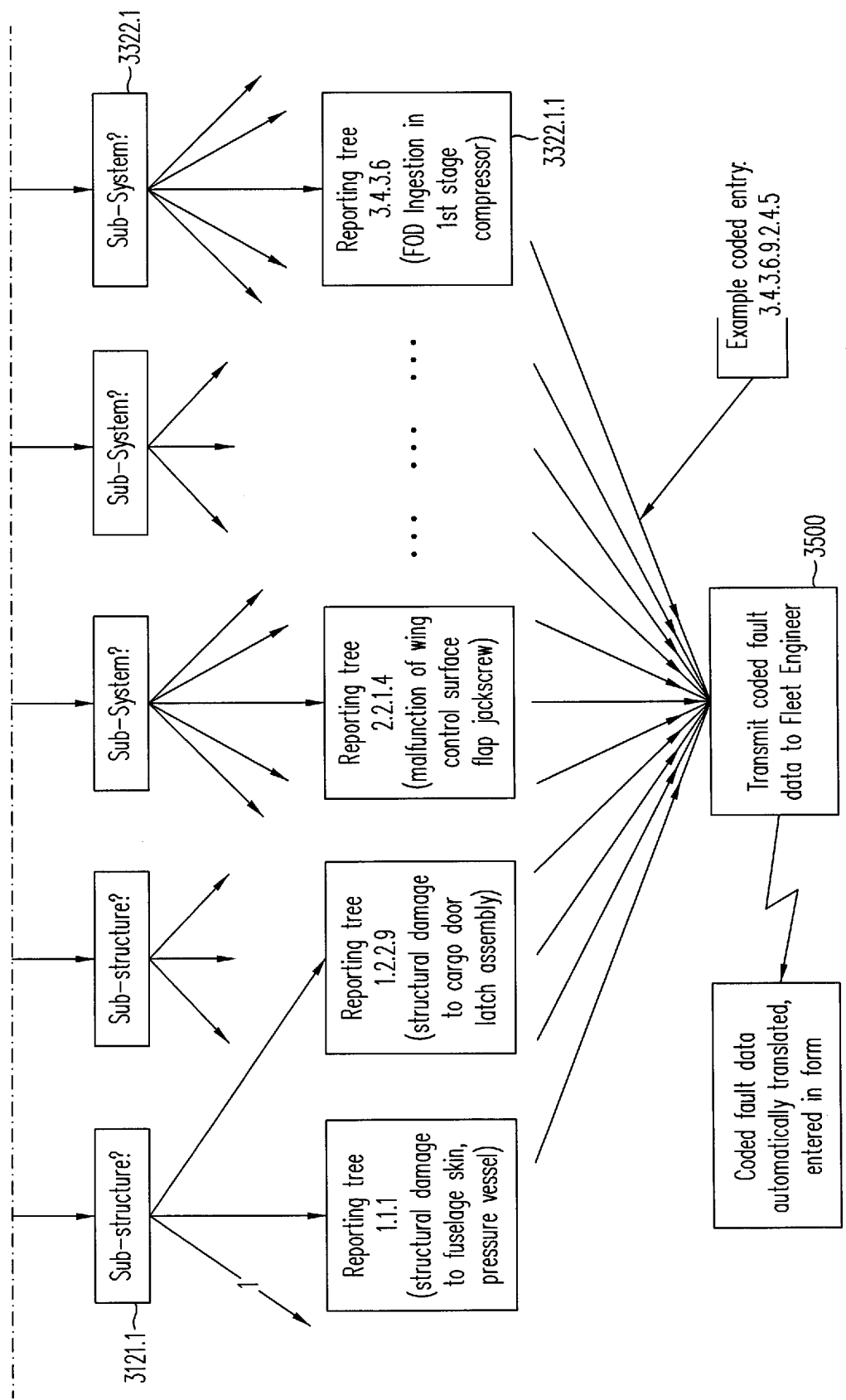
FIG. 2 is a flowchart illustrating a method of interview and data entry in a decision tree, in accordance with an embodiment.

When a Decision Tree Interview is initiated, a series of questions are generated by a Quick Reporting Tree system operating from a remotely located computer, in contact with ramp personnel via, for example, the RR cell phone. FIG. 2 is an exemplary illustration of how the interview process may proceed.

Upon contacting the Quick Reporting Tree system 3000 by RR cell phone, the first instruction that may appear on the user's screen (or by audio instruction) may be a request to Enter tail number (block 3010) (which may also include a request for an image). After entry and transmission of this data via keypad, for example, the next request may be to Enter date, time and location (block 3020). The next request inquires about the general nature of the problem. Problem type? (block 3030) may list, for example, choices such as Structural damage=1, Systems malfunction=2, Engine malfunction=3, etc., whereupon the user makes a simple numeric entry. Selection from among the multiple choices available result in navigation through one of the branches of the selection tree. For example, if the damage is structural, the entry would be "1" on the keypad. This would lead to another branch point, Structure? (block 3120) with choices for sections of the aircraft (such as Fuselage=1, Wing=2, Empennage=3, etc.). If the damage is to the fuselage, the user may enter "1," which then triggers an inquiry from Fuselage (block 3121) called Sub-structure? (block 3121.1) to identify which sub-structure of the fuselage is involved (e.g., skin, pressure vessel, cargo door, etc.). A code is built as each branch point is queried. Using the example above, Structural damage (1), fuselage (1), sub-structure fuselage skin/pressure vessel (1) would be assigned a reporting tree code that may read, for example, as "1.1.1". The code is amended as finer granularity of detail is developed from the Decision Tree Interview.

Another example of a result from a Decision Tree Interview might occur in response to an engine malfunction and damage due to foreign object debris (FOD) ingestion in the 1$^{st}$ stage compressor. This might be assigned a code, for example, of "3.4.3.6".

At a point appropriate to the specific problem, the code may be further amended with recommendations or instructions for remediation of the problem. This may result in a longer code with additional numerical components. For example, in the FOD ingestion engine malfunction, the amended code may look like "3.4.3.6.9.2.4.6", which encodes repair instructions, and removal of the aircraft from service, if necessary, in addition to the evidentiary record upon which the recommendations are based. The coded fault data is then Transmitted (block 3500 and 1185) to the Airport/Ramp (block 1100) for receipt by the ramp area user and to Fleet Engineer (received in block 1270). The coded fault data received by Fleet Engineer (block 1270) is translated automatically for entry in an Aircraft Disposition form (in block 1280), which is effectively a code translated report of damage/malfunction assessment and may include recommendations. Fleet Engineer then issues to ramp personnel Aircraft Disposition Instructions (block 1190), at which point the Decision Tree Interview is concluded (Action Complete—block 1195).

Figure 3:
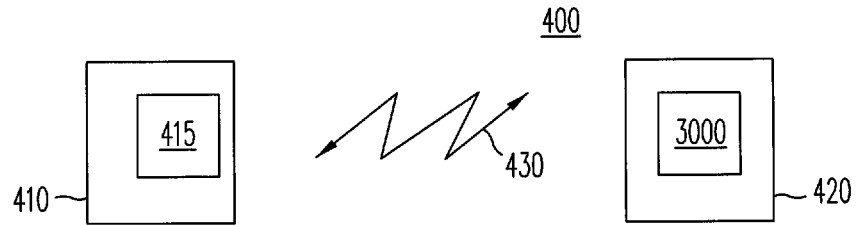
FIG. 3 is a block diagram illustrating a system for reporting, recording assessing and disposition of aircraft damage and malfunction incidents, in accordance with an embodiment.

An exemplary illustration of a system for reporting, recording assessing and disposition of aircraft damage and malfunction incidents is shown in FIG. 3. The system 400 may be a communication device equipped with still and/or video imaging capability, such as a wireless cell phone 410 with a digital camera 415, in communication with a remote computer server 420, on which the Quick Reporting Tree system 3000 is operating. Both the cell phone 410 and the server 420 are coupled via a communications network 430.

In addition to enabling rapid assessment for repair vs. dispatch decisions concerning aircraft, Quick Reporting Tree system 3000 provides a means for the archival acquisition of damage and malfunction histories that may be analyzed across aircraft fleets, airline carriers, airport service facilities, components, component suppliers and a myriad of other relational criteria to build statistical databases helpful, for example, to observe trends, identify potential causal effects, improve safety, products and processes, control operating production costs for manufacturers or operating costs for carriers. This process may be carried out in a decision tree structure like Quick Reporting Tree 3000 that accesses a relational database of the information acquired from many accumulated incidents, using various software methods of data mining.

Figure 4:
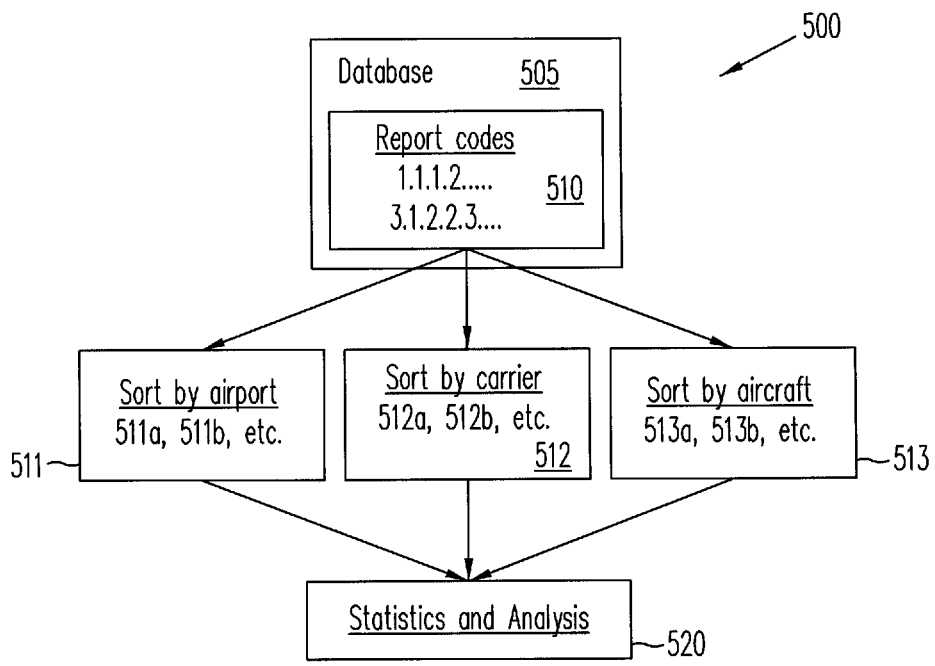
FIG. 4 is a flowchart illustrating a method of deriving statistical trends in damage and malfunction incidents, in accordance with an embodiment.
Figure 4:
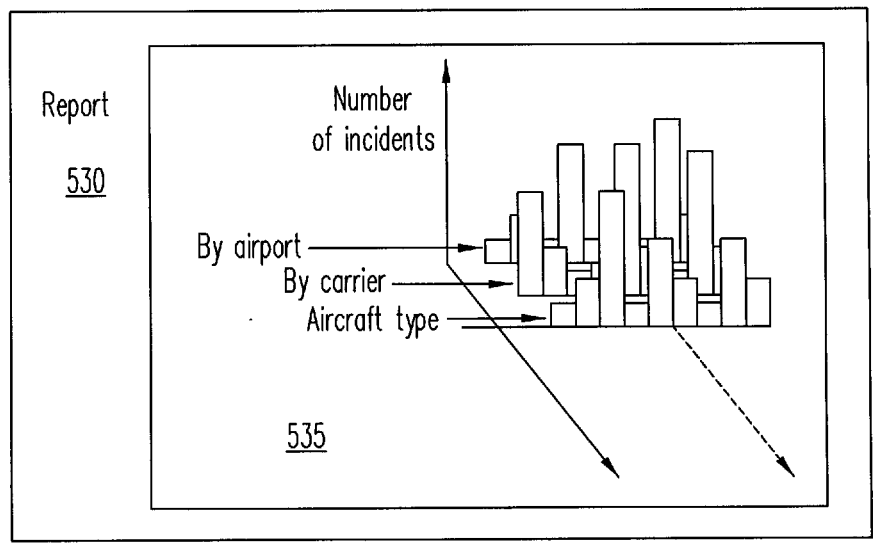

FIG. 4 is a flowchart illustrating a method of deriving statistical trends in damage and malfunction incidents for Analysis and Forecasting 500, in accordance with an embodiment.

Report codes (block 510) may be retrieved from a stored database (505) and sorted according to any required criteria. For example, If the incidence of cargo door damage during loading is sorted by airport (block 511), a histogram may be generated for all airports (e.g., 511*a*, 511*b*, etc.), for all carriers (block 512) or a subset of carriers (e.g., 512*a*, 512*b*, etc.), for one or more types of aircraft (block 513) (e.g., commuter (513*a*), medium-range (513*b*), jumbo (513*c*), etc.). Many different statistical analysis methods (block 520) may be employed, which may also include correlation analysis between categories to search for behavioral trends, which are all within the spirit of the embodiment. The results of the analysis and forecasting may be presented in a Report (block 530), which may include presentation of data, for example, in histogram form (block 535) or other forms or representation graphically, in tables and in narrative description of information.

Report (block 530) may provide information to identify relationships between damage/malfunction types and rate of occurrences and correlation to conditions that predispose such occurrences. This may help to indicate areas such as procedures, design modification, or training that could beneficially reduce the number of such occurrences, reducing airline carrier costs, delays, inconveniences and supplier warranty costs.

Embodiments described above illustrate but do not limit the invention. It should also be understood that numerous modifications and variations are possible in accordance with the principles of the present invention. Accordingly, the scope of the invention is defined only by the following claims.

I claim:

1. A method of determining whether an aircraft is ready to fly or should be repaired in light of damage and/or malfunction to the aircraft, the method comprising:

generating, by a computer, coded fault data comprising a sequence of single-digit integers that encodes types of damage/malfunction and locations of damage/malfunction according to a decision tree, wherein the generating the coded fault data comprises:
  presenting, on a cell phone of the user, a series of questions regarding the damage and/or malfunction according to a traversal of the decision tree based on answers to the series of questions,
  receiving, at the computer, a sequence of numeric key entries entered on the user's cell phone and corresponding to the answers to the series of questions, and
  generating each digit of the coded fault data as each numeric key entry is received in response to each of the series of questions presented;
generating, by the computer, an instruction or recommendation based on the coded fault data, wherein the instruction or recommendation is encoded in one or more integers;
appending, by the computer, the one or more integers encoding the instruction/recommendation to the sequence of single-digit integers of the coded fault data to generate amended fault data;
storing and classifying the amended fault data according to its sequence of single-digit integers that encodes types of damage/malfunction and locations of damage/malfunction;
electronically transmitting the amended fault data for review in deciding whether the aircraft is ready to fly or should be repaired; and
translating the amended fault data for entry in an aircraft disposition report form.

2. The method of claim 1, further comprising a flight dispatch supervisor receiving the amended fault data from the computer.

3. The method of claim 2, wherein the flight dispatch supervisor decides whether the aircraft is ready to fly or should be repaired based upon the amended fault data.

4. The method of claim 1, wherein deciding whether the aircraft is ready to fly or should be repaired includes one or more of:
  deciding to make minor repairs and dispatch the aircraft;
  deciding to remove the aircraft from service for major repair; and
  deciding to dispatch the aircraft without repair.

5. The method of claim 1, further comprising receiving one or more of photographs taken by the user's cell phone, the photographs including a photograph of the damage and a photograph of an aircraft identifier.

6. The method of claim 1, further comprising:
  instructing the user to deploy a simple non-destructive inspection (NDI) equipment on the damage, wherein the simple NDI equipment indicates a result of pass or fail, and wherein the generating the coded fault data is performed upon indication of a simple NDI pass result; and
  receiving, at the computer, a report of an advanced NDI analysis upon indication of simple NDI fail result, wherein:
    the advanced NDI analysis is performed at a remote location using NDI video and NDI data sent via a video and data link from a ramp-side advanced NDI equipment,
    the advanced NDI analysis report comprises a string of integer numbers encoding damage types, damage locations, and an instruction/recommendation, and
    the amended fault data comprises the string of integer numbers of the advanced NDA analysis report.

7. The method of claim 1, wherein the series of questions are presented on a screen of the user's cell phone.

8. The method of claim 1, wherein the series of questions are presented as voice prompts on the user's cell phone.

9. A system for assisting a decision whether an aircraft should be repaired or is ready to fly in view of damage and/or malfunction to the aircraft, the system comprising:
   a cell phone configured to wirelessly transmit and receive data; and
   a computer server configured to:
      wirelessly communicate with the cell phone,
      generate coded fault data comprising a sequence of single-digit integers that encodes types of damage/malfunction and locations of damage/malfunction according to a decision tree, wherein the computer server is configured to generating the coded fault data by:
         presenting, on the cell phone for a user observing the damage and/or malfunction from a location remote from the computer server, a series of questions regarding the damage and/or malfunction according to a traversal on the decision tree based on answers to the series of questions,
         receiving a sequence of numeric key entries entered on the cell phone and corresponding to the answers to the series of questions, and
         generating each digit of the coded fault data as each numeric key entry is received in response to each of the series of questions presented,
      generate an instruction or recommendation based on the coded fault data, wherein the instruction or recommendation is encoded in one or more integers,
      append the one or more integers encoding the instruction/recommendation to the sequence of single-digit integers of the coded fault data to generate amended fault data,
      store and classify the amended fault data according to its sequence of single-digit integers that encodes types of damage/malfunction and locations of damage/malfunction,
      electronically transmit the amended fault data for review in deciding whether the aircraft is ready to fly or should be repaired, and
      translate the amended fault data for entry in an aircraft disposition report form.

10. The system of claim 9, wherein the computer server comprises a database for storing the amended fault data.

11. The system of claim 10, wherein the computer server is further configured to;
   retrieve the amended fault data from the database; and
   perform a statistical analysis on the amended fault data, wherein the statistical analysis identifies a correlation between a type and a rate of damage occurrence according to one or more relational criteria, the relational criteria including which airline carrier the aircraft belongs to, which airport the aircraft is stationed at, what type the aircraft is, or which component supplier manufactured a damaged component.

12. The system of claim 9, wherein the computer server is further configured to receive one or more of photographs taken by the cell phone, the photographs including a photograph of the damage and a photograph of an aircraft identifier.

13. The system of claim 9, wherein the computer server is further configured to receive a report of an advanced non-destructive inspection (NDI) analysis, wherein:
   the advanced NDI analysis is performed at a remote location using NDI video and NDI data sent via a video and data link from a ramp-side advanced NDI equipment;
   the advanced NDI analysis report comprises a string of integer numbers encoding damage types, damage locations, and an instruction/recommendation; and
   the amended fault data comprises the string of integer numbers of the advanced NDA analysis report, 14. The system of claim 9, wherein the series of questions are presented on a screen of the cell phone.

15. The system of claim 9, wherein the series of questions are presented as voice prompts on the cell phone.

\* \* \* \* \*